(12) United States Patent
Kim et al.

(10) Patent No.: US 10,025,811 B2
(45) Date of Patent: Jul. 17, 2018

(54) METHOD AND APPARATUS FOR DEDUPLICATING ENCRYPTED DATA

(71) Applicant: ELECTRONICS AND TELECOMIVIUNICATIONS RESEARCH INSTITUTE, Daejeon (KR)

(72) Inventors: Keonwoo Kim, Daejeon (KR); Taek-Young Youn, Daejeon (KR); Ku Young Chang, Daejeon (KR); Nam-Su Jho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 248 days.

(21) Appl. No.: 15/051,574

(22) Filed: Feb. 23, 2016

(65) Prior Publication Data

US 2017/0193032 A1    Jul. 6, 2017

(30) Foreign Application Priority Data

Jan. 4, 2016  (KR) .......................... 10-2016-0000623

(51) Int. Cl.
    *H04L 29/06* (2006.01)
    *G06F 17/30* (2006.01)
    *H04L 9/32* (2006.01)

(52) U.S. Cl.
    CPC ...... *G06F 17/30371* (2013.01); *H04L 9/3242* (2013.01); *H04L 63/0428* (2013.01); *H04L 2209/24* (2013.01)

(58) Field of Classification Search
    CPC .................................................. G06F 17/30371
    USPC ........................................................ 713/153
    See application file for complete search history.

(56) References Cited

U.S. PATENT DOCUMENTS

| | | | |
|---|---|---|---|
| 7,545,930 B1* | 6/2009 | Shields | G06Q 20/1085 380/264 |
| 8,199,911 B1* | 6/2012 | Tsaur | G06F 21/6209 380/278 |
| 9,773,118 B1* | 9/2017 | Bennett | G06F 21/60 |
| 2005/0258234 A1* | 11/2005 | Silverbrook | G06Q 10/087 235/379 |
| 2008/0297326 A1* | 12/2008 | Chakraborty | H04L 63/12 340/10.52 |

(Continued)

FOREIGN PATENT DOCUMENTS

| KR | 10-0985169 B1 | 10/2010 |
|---|---|---|
| KR | 10-1505263 B1 | 3/2015 |

OTHER PUBLICATIONS

Mihir Bellare et al., "Message-Locked Encryption and Secure Deduplication", Mar. 2013, pp. 1-29.

(Continued)

*Primary Examiner* — Dant B Shaifer Harriman (57) ABSTRACT

In a client, an encryption key is created using plain text data, a first tag is created using the encryption key, and the plain text data are encrypted under the encryption key to create encrypted data. The first tag is transmitted to the server to confirm whether the encrypted data is duplicated and after transmitting the first tag, the encrypted data is transmitted to the server in accordance with the request of the encrypted data from the server.

16 Claims, 10 Drawing Sheets

(56) References Cited

U.S. PATENT DOCUMENTS

| | | | |
|---|---|---|---|
| 2008/0304664 A1* | 12/2008 | Suthaharan | H04L 9/0662 380/46 |
| 2012/0167087 A1* | 6/2012 | Lee | G06F 9/45558 718/1 |
| 2012/0191675 A1 | 7/2012 | Kim et al. | |
| 2012/0204024 A1 | 8/2012 | Augenstein et al. | |
| 2012/0210127 A1* | 8/2012 | Kameda | G06F 21/31 713/168 |
| 2014/0258655 A1 | 9/2014 | Park et al. | |
| 2014/0281486 A1* | 9/2014 | Nayshtut | G06F 21/6227 713/153 |
| 2014/0297603 A1 | 10/2014 | Kim et al. | |
| 2017/0193032 A1* | 7/2017 | Kim | G06F 17/30371 |

OTHER PUBLICATIONS

John R. Douceur et al., "Reclaiming Space from Duplicate Files in a Serverless Distributed File System" Jul. 2002, pp. 1-13, Microsoft.

* cited by examiner

| First tag list | Second tag list | Encrypted data list | Client list |
|---|---|---|---|
| t1 | T'1 | C1 | U1 |
| t2 | T'2 | C2 | U2 |
| t3 | T'3 | C3 | U1 |

| First tag list | Second tag list | Encrypted data list | Client list |
|---|---|---|---|
| t1 | T'1 | C1 | U1 |
| t2 | T'2 | C2 | U2 |
| t3 | T'3 | C3 | U1, U3 |

METHOD AND APPARATUS FOR DEDUPLICATING ENCRYPTED DATA

CROSS-REFERENCE TO RELATED APPLICATION

This application claims priority to and the benefit of Korean Patent Application No. 10-2016-0000623 filed in the Korean Intellectual Property Office on Jan. 4, 2016, the entire contents of which are incorporated herein by reference.

BACKGROUND OF THE INVENTION (a) Field of the Invention

The present invention relates to a method and an apparatus for deduplicating encrypted data.

(b) Description of the Related Art

A data deduplication technique is a technique which does not repeatedly store all the same data but removes duplicated parts. This technique is very important because a storage space of a database (DB) or a cloud system is saved and redundant data is not transmitted in a network, thereby reducing a bandwidth.

A deduplication technique of encrypted data is a technique which encrypts data to provide privacy of data which is stored in a remote data storage such as a DB system or a cloud service, thereby storing cipher text data rather than plain text data and removing duplicated cipher text data. According to an encryption method of the related art, people who want to encrypt a plain text use a unique encryption key for a cipher text corresponding to the same plain text, so that a plurality of different cipher texts for one plain text is created. Therefore, plain text data can be deduplicated but encrypted data corresponding to the same plain text data is different, so that there is no advantage in that a storage space is saved by deduplication.

In order to deduplicate encrypted data, a paper entitled "Reclaiming Space from Duplicate Files in a Serverless Distributed File System" was presented on 2002 and a concept of convergent encryption (CE) was suggested for the first time. In the CE, an encryption key is derived by a deterministic function such as a value obtained by hashing a message and a plain text message are encrypted under the encryption key by a block encryption algorithm to create a cipher text. As a result, when different users have the same plain text and encrypt the plain text with CE, only the same encryption key is created for every user. That is, even though the plain text data is possessed by different users, only one cipher text data corresponding to the plain text data is created, so that the encrypted data may be deduplicated. However, the paper mentioned only a basic concept of the CE but did not describe specific configuration and operation for deduplicating encrypted data between a client who requests to encrypt and store the data and a server (or a DB) which stores the data.

Further, a paper regarding message based encryption and safe deduplication entitled "Message-Locked Encryption and Secure Deduplication" was presented in order to deduplicate encrypted data, based on the above paper. This paper suggested four encrypted data deduplication techniques (CE, HCE1, HCE2, RCE) and has the following features and problems.

According to the CE technique of the related art entitled "Message-Locked Encryption and Secure Deduplication", the client hashes the plain text data to create an encryption key and encrypts the plain text data under the encryption key with a block encryption algorithm to create encrypted data. Thereafter, the client transmits the encrypted data to the server. The server which receives the encryption data from the client uses a value obtained by hashing the encrypted data as a tag in order to identify the received encrypted data. The server compares the tag calculated by the server with a tag list which is stored in the storage of the server and stores the received encrypted data and the tag only when there is no matching tag. When there is a tag in the tag list stored in the storage of the server which matches the tag calculated by the server, it means that the data which is stored in the storage of the server and the transmitted encrypted data are duplicated. Therefore, the server does not store the encrypted data which is transmitted from the client. As a result, a deduplication process for the same encrypted data is enabled. According to the CE technique, the client unconditionally transmits the encrypted data to the server and the server determines whether to deduplicate the encrypted data, which causes the network bandwidth to be significantly wasted. Further, the server has a burden of calculating tags for all transmitted encrypted data. Particularly, when a data size is very large, like motion picture data, a burden of calculating the tag is significant.

According to the HCE1 technique of "Message-Locked Encryption and Secure Deduplication" of the related art, the client hashes the plain text data to be used as an encryption key and hashes the encryption key again to create a tag. When a tag for identifying the encrypted data is created, differently from the CE technique, according to the HCE1 technique, a hash value for the encrypted data is not used as a tag but a hash value for the encryption key is used as a tag. Thereafter, the client transmits the encrypted data and the tag to the server. When there is a tag in the tag list, which is stored in a database of the server, which matches the received tag, the server which receives the encrypted data and the tag does not store the received encrypted data. When there is no matching tag, the server stores the received encrypted data and the tag. According to this manner, the server may perform deduplication process on the encrypted data. However, as mentioned in the paper, the HCE1 technique is vulnerable to a duplicate faking attack and a data erasure attack so that the HCE1 technique is inappropriate to be used in an actual environment.

Further, according to the HCE2 technique of "Message-Locked Encryption and Secure Deduplication" of the related art, an uploading process of the HCE2 is the same as an operating method of the HCE1 but a downloading process is different from that of the HCE1. Similarly to the HCE1, the client transmits a tag which is stored in the client to the server to download the encrypted data from the server and the server transmits the encrypted data which matches the received tag, to the client. Thereafter, according to the HCE1 technique, the client decodes the plain text data using the received encrypted data and the encryption key which is stored in the client to end the operation. However, according to the HCE2 technique, after decoding the plain text data, the client calculates a hash value for the decoded plain text data and hashes the hash value again to create a new tag. The client compares the stored tag with the newly created tag and then when two tags match, stores the plain text data for the received encrypted data and ends the operation. When two tags do not match, the client deletes all data related with the received encrypted data and ends the operation. According to the technique, the duplicate faking attack which is mentioned in the HCE1 may be prevented but the technique is still vulnerable to the data erasure attack, so that the technique is inappropriate to be used in an actual environment.

For example, it is assumed that the client stores its own encrypted data in the cloud server and the client deletes the data. There may be a serious problem in that when the client tries to download its own encrypted data later, the data disappears due to an erasure attack by a malicious attacker so that the data may not be permanently recovered.

Further according to the RCE technique of "Message-Locked Encryption and Secure Deduplication" of the related art, the client may have another private secret key which is unique for every client in addition to the encryption key which is derived from the message. In the RCE technique, the operation method is the same as the HCE2 technique except that the client creates two encrypted data using the private secret key to upload the data to the server and inspects tag consistency using two encrypted data during the download process. However, similarly to the HCE2 technique, the RCE technique is vulnerable to the data erasure attack.

As examined in the above methods, the CE and the message-locked encryption (MLE) based encrypted data duplication processing methods have the following problems. In the CE based encrypted data deduplication processing technique, all encrypted data is transmitted from the client to the server, so that the network bandwidth is significantly wasted and the server needs to calculate tags for all encrypted data. Therefore, the calculating burden is very large. Further, the encrypted data duplication processing technique by the HCE1 method is vulnerable to both the duplicate faking attack and the data erasure attack, so that the technique is inappropriate to be used in the actual environment. Further, the HCE2 and RCE based encrypted data duplication processing methods are also vulnerable to the data erasure attack, so that the data of the client is deleted from the server. Furthermore, the methods also mention only a data encryption and decryption method for the deduplication process of the encrypted data and a tag creating method but do not clearly describe a specific operation of a deduplication process of the encrypted data in the client and the server.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for deduplicating encrypted data which may prevent duplicate faking attack and data erasure attack while saving a network bandwidth.

According to an exemplary embodiment of the present invention, a method for deduplicating encrypted data in a client is provided. The method may include creating an encryption key using plain text data, creating a first tag using the encryption key, encrypting the plain text data under the encryption key to create encrypted data, transmitting the first tag to a server to confirm whether the encrypted data is duplicated, and transmitting the encrypted data to the server in accordance with a request of the encrypted data from the server, after transmitting the first tag.

The method may further include: after transmitting the first tag, when the client receives a request of a second tag from the server, creating the second tag using the encrypted data, transmitting the second tag to the server to confirm whether the encrypted data is duplicated, and after transmitting the second tag, transmitting the encrypted data to the server in accordance with a request of the encrypted data from the server.

The creating of the second tag may include hashing the encrypted data to create the second tag.

The method may further include, when there is no request from the server after transmitting the second tag, storing the encryption key and the first tag.

When it is confirmed that the encrypted data is not duplicated using the first tag or the second tag, the request of the encrypted data may be transmitted by the server, and when it is confirmed that the encrypted data is duplicated using the first tag, the request of the second tag may be transmitted by the server.

The creating of the encryption key may include hashing the plain text data to create the encryption key and the creating of the first tag may include hashing the encryption key to create the first tag.

Another exemplary embodiment of the present invention provides a method for deduplicating encrypted data in a server. The method may include receiving a first tag from a client, confirming whether encrypted data is duplicated in a DB using the first tag, when it is confirmed that the encrypted data is not duplicated using the first tag, requesting the encrypted data to the client, receiving the encrypted data from the client, calculating a second tag value using the encrypted data, and storing the first tag and the encrypted data which are received from the client, the calculated second tag value, and an identifier of the client in the DB.

The method may further include when it is confirmed that the encrypted data is duplicated using the first tag, requesting a second tag to the client, receiving a second tag which is calculated in the client from the client, and when it is confirmed that the encrypted data is duplicated using the second tag, adding only the identifier of the client corresponding to the first tag and the second tag which are stored in the DB.

The method may further include when it is confirmed that the encrypted data is not duplicated using the second tag, requesting the encrypted data to the client, receiving the encrypted data from the client, calculating a second tag value using the encrypted data, and storing the first tag and the encrypted data which are received from the client, the calculated second tag value, and the identifier of the client in the DB.

The calculating of a second tag value includes hashing the encrypted data to create the second tag value and the second tag which is calculated in the client may be a hash value of the encrypted data.

The DB may include a first tag list, an encrypted data list, a second tag list, and a client list, the confirming of whether the encrypted data is duplicated in the DB using the first tag may include confirming whether there is a tag in the first tag list of the DB which is the same as the first tag received from the client, and the confirming of whether the encrypted data is duplicated in the DB using the second tag may include confirming whether there is a tag in the second tag list of the DB which is the same as the second tag received from the client.

Another exemplary embodiment of the present invention may provide an apparatus for deduplicating encrypted data in a server. The apparatus may include a transceiver, a memory, and a processor. The transceiver may receive a first tag and a second tag from a client. The memory may store a DB. The processor may confirm whether the encrypted data is duplicated in the DB using the first tag and when it is confirmed that the encrypted data is duplicated using the first tag, confirm again whether the encrypted data is duplicated in the DB using the second tag, and when it is confirmed that the encrypted data is not duplicated, request the encrypted data to the client through the transceiver.

The transceiver may receive the encrypted data from the client, and the processor may calculate a second tag value using the encrypted data and store the first tag and the encrypted data which are received from the client, the calculated second tag value, and an identifier of the client in the DB.

When the processor confirms that the encrypted data is duplicated using the first tag, the processor may request the second tag to the client through the transceiver and when the processor confirms that the encrypted data is duplicated using the second tag, the processor may add only the identifier of the client corresponding to the first tag and the second tag stored in the DB.

The DB may include a first tag list, an encrypted data list, a second tag list, and a client list and when there are tags in the first tag list and the second tag list of the DB which are same as the first tag and the second tag received from the client, respectively, the processor may determine that the encrypted data is duplicated.

The processor may hash the encrypted data to calculate a second tag value.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification and claims, unless explicitly described to the contrary, the word "comprise" and variations such as "comprises" or "comprising", will be understood to imply the inclusion of stated elements but not the exclusion of any other elements.

Now, a method and an apparatus for deduplicating encrypted data according to an exemplary embodiment of the present invention will be described in detail with reference to the drawings.

Figure 1:
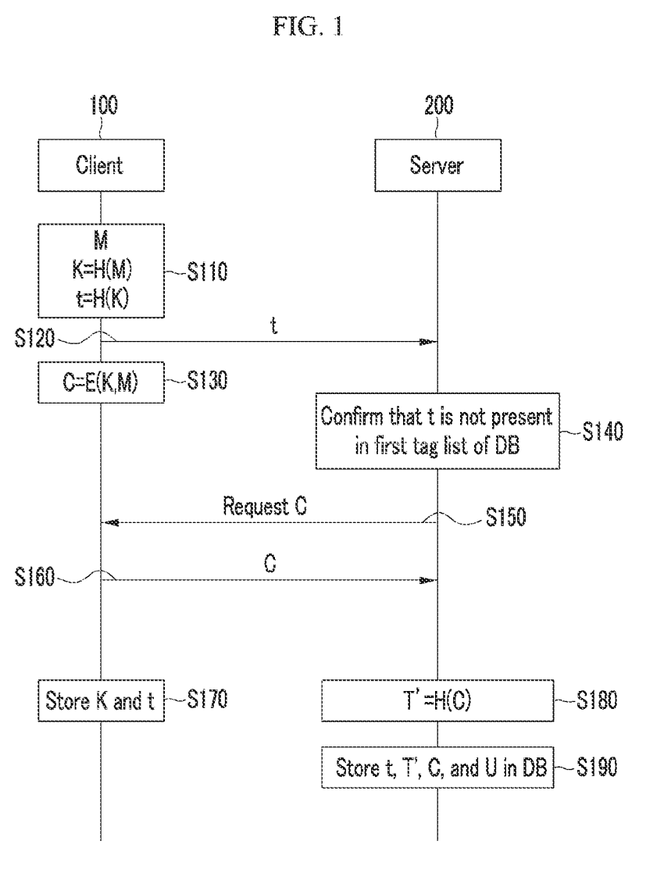
FIG. 1 is a view illustrating an example of a method in which a client according to an exemplary embodiment of the present invention uploads encrypted data to a server.

FIG. 1 is a view illustrating an example of a method in which a client according to an exemplary embodiment of the present invention uploads encrypted data to a server.

Referring to FIG. 1, differently from methods of the related art, a client 100 does not transmit large encrypt data to a server 200 at first transmission. In an exemplary embodiment of the present invention, the client 100 transmits a small tag t to the server 200 first and the server 200 checks whether the encrypted data is duplicated. Thereafter, the client 100 transmits only encrypted data which is not duplicated to the server 200.

The client 100 refers to a user who tries to store data in a cloud server or a data storage server and particularly, a user who uses a server to store the encrypted data. The client 100 uses a computer device or a terminal to perform the deduplication process of the encrypted data and the client 100 may refer to a computer device or a terminal of the user. The server 200 may be a cloud storage server or a data storage server, and the server 200 has a DB for storing encrypted data and meta data related with the encrypted data. Here, the meta data may be a tag and a client identifier which will be described below.

In the exemplary embodiment of the present invention, two types of tags are used to confirm whether the encrypted data is duplicated. A first tag is a hash value for an encryption key and a second tag is a hash value for encrypted data. The first tag is created in the client 100 and the second tag is created in the client 100 and the server 200.

Now, a specific method will be described below.

The client 100 hashes plain text data M to create an encryption key K and hashes the encryption key K again to create a first tag tin step S110. In FIG. 1, HO refers to a hash function.

Thereafter, the client 100 transmits the first tag t to the server 200 in step S120 and encrypts plain text data M under an encryption key K using a block encryption algorithm [E(M, K)] to create encrypted data C corresponding to the plain text data M and the encryption key K in step S130.

The server 200 which receives the first tag t confirms whether there is a tag in a first tag list of the DB which is the same as the received tag t.

As illustrated in FIG. 1, when the server 200 confirms that there is no tag in the first tag list which is the same as the tag t received from the client 100 in step S140, the server 200 requests the encrypted data C to the client 100 in step S150. When there is no tag in the first tag list which is the same as the tag t received from the client 100, it means that there is no duplicated encrypted data in the DB. Accordingly, the server 200 requests the encrypted data C to the client 100.

The client 100 to which the encrypted data C is requested transmits the encrypted data C to the server 200 in step S160 and stores the encryption key K and the first tag tin step S170.

The server 200 which receives the encrypted data C hashes the encrypted data C to calculate a second tag T' in step S180 and stores the first tag t, the second tag T', the encrypted data C. and a client identifier U in its own DB in step S190.

As described above, the client 100 confirms whether the encrypted data C is duplicated using the tag t first without transmitting the encrypted data C to the server 200, so that only the encrypted data C which is not duplicated is transmitted to the server 200. According to this method, the client 100 uses the first tag t to confirm whether the encrypted data is duplicated, so that an operation amount in the client 100 is reduced. Further, the server 200 creates the second tag T' not for all encrypted data but only for the received encrypted data, so that the operation amount in the server 200 is also reduced.

In the meantime, when there is a tag in the first tag list which is the same as the tag t received from the client 100, the server 200 requests the second tag to the client 100, so that a process for confirming whether the encrypted data C is duplicated again is performed, which will be described in detail with reference to FIGS. 3 and 4.

Figure 2:
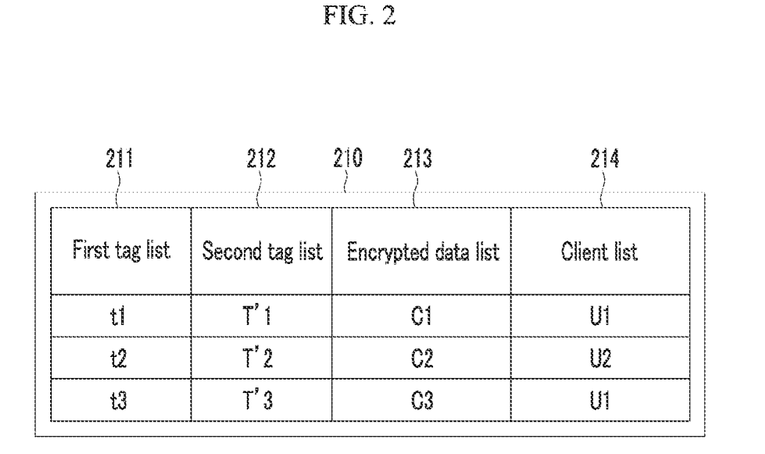
FIG. 2 is a view illustrating an example of a DB structure of a server according to an exemplary embodiment of the present invention.

FIG. 2 is a view illustrating an example of a DB structure of a server according to an exemplary embodiment of the present invention.

Referring to FIG. 2, a DB 210 for storing the encrypted data and meta data related to the encrypted data includes a first tag list 211, a second tag list 212, an encrypted data list 213, and a client list 214.

The first tag list 211 is calculated by the client 100 and a first tag t which is received from the client 100 by the server 200 is stored therein.

In the second tag list 212, a second tag T' which is calculated for encrypted data, which is received from the client 100 by the server 200, by the server is stored.

In the encrypted data list 213, the encrypted data C which is received from the client 100 is stored.

In the client list 214, a client identifier which possesses the encrypted data is stored.

For example, when a first tag which is calculated for unduplicated encrypted data C1 of a client identifier U1 by a client corresponding to the client identifier U1 is t1 and a second tag which is calculated by the server 200 is T'1, the server 200 stores the first tag t1, the second tag T'1, the encrypted data C1, and the client identifier U1 in the first tag list, the second tag list, the encrypted data list, and the client list, respectively. Further, when a first tag which is calculated for unduplicated encrypted data C2 of a client identifier U2 by a client corresponding to the client identifier U2 is t2 and a second tag which is calculated by the server 200 is T'2, the server 200 stores the first tag t2, the second tag T'2, the encrypted data C2, and the client identifier U2 in the first tag list, the second tag list, the encrypted data list, and the client list, respectively. Further, when a first tag which is calculated for unduplicated encrypted data C3 of a client identifier U1 by a client corresponding to the client identifier U1 is t3 and a second tag which is calculated by the server 200 is T'3, the server 200 stores the first tag t3, the second tag T'3, the encrypted data C3, and the client identifier U1 in the first tag list, the second tag list, the encrypted data list, and the client list, respectively.

Through this method, the server 200 may store only the unduplicated encrypted data in the server 200.

Figure 3:
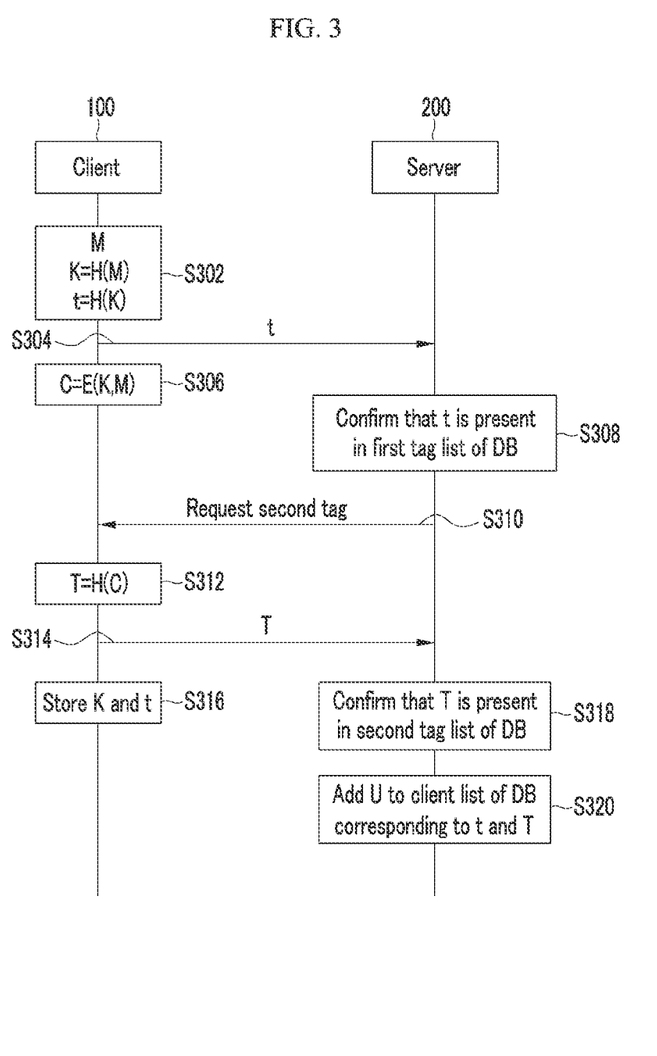
FIGS. 3 and 4 are views illustrating another example of a method in which a client according to an exemplary embodiment of the present invention uploads encrypted data to a server.
Figure 4:
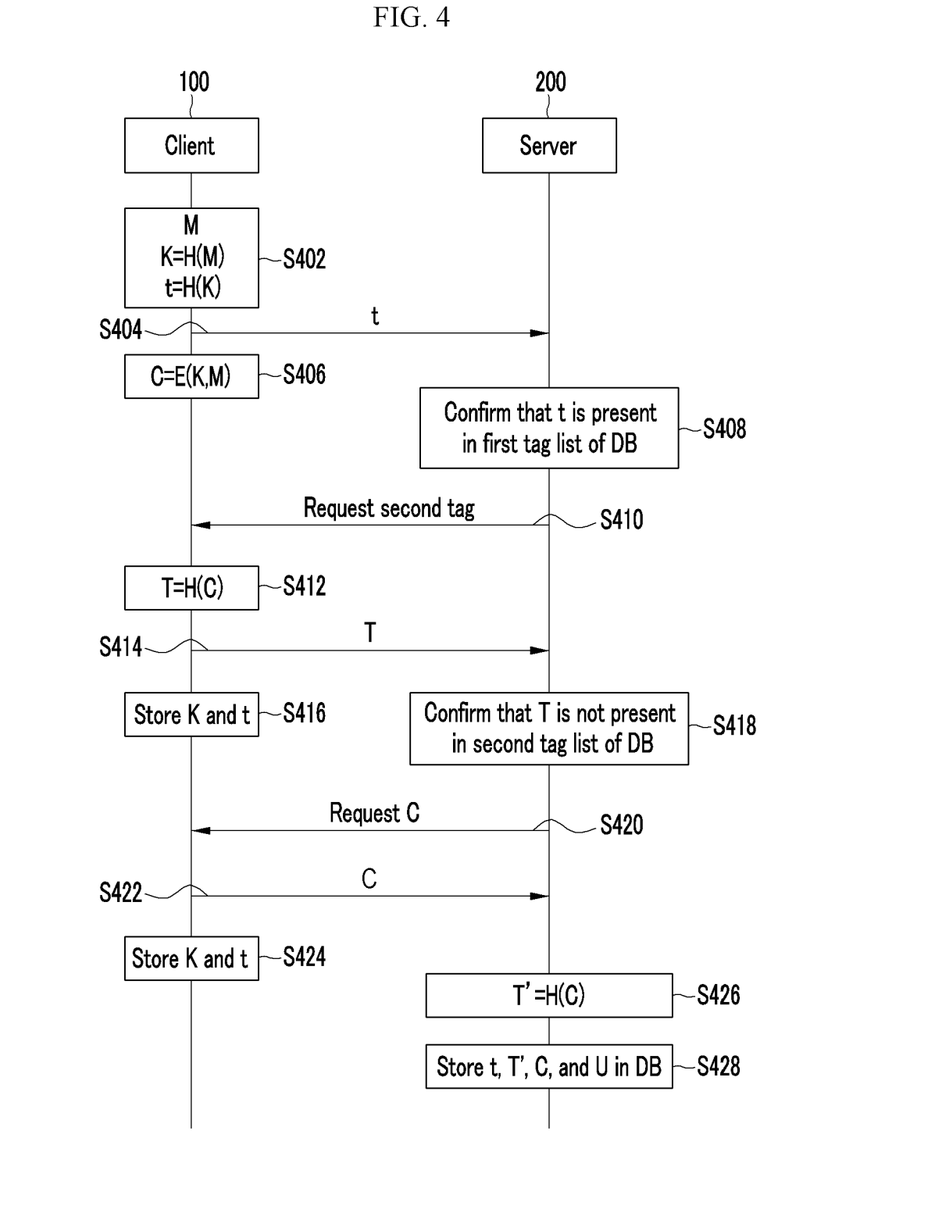
Figure 5:
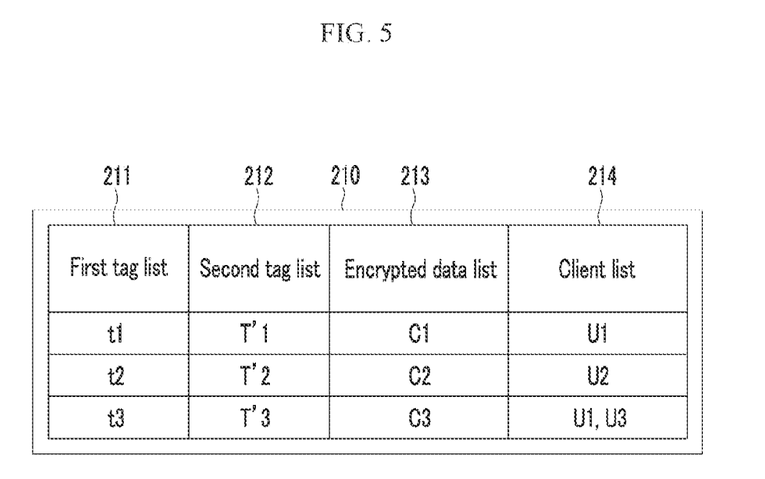
FIG. 5 is a view illustrating a DB after performing a deduplication process of encrypted data in a server according to an exemplary embodiment of the present invention.

FIGS. 3 and 4 are views illustrating another example of a method in which a client according to an exemplary embodiment of the present invention uploads encrypted data to a server. Further, FIG. 5 is a view illustrating a DB after performing a deduplication process of encrypted data in a server according to an exemplary embodiment of the present invention.

Referring to FIG. 3, the client 100 hashes the plain text data M to create the encryption key K and hashes the encryption key K again to create the first tag t in step S302.

The client 100 transmits the first tag t to the server 200 in step S304 and encrypts plain text data M under an encryption key K using a block encryption algorithm [E(M, K)] to create encrypted data C corresponding to the plain text data M and the encryption key K in step S306.

The server 200 which receives the first tag t confirms whether there is a tag in a first tag list of the DB which is the same as the received tag t.

When the server 200 confirms that there is a tag in the first tag list which is the same as the tag t received from the client 100 in step S308, the server 200 requests the second tag T to the client 100 in step S310. When there is a tag in the first tag list which is the same as the tag received from the client 100, it means that there may be duplicated encrypted data in the DB. Accordingly, the server 200 requests the second tag T to the client 100 in order to confirm again whether the encrypted data C is duplicated.

The client 100 to which the second tag T is requested hashes the encrypted data C to create the second tag T in step S312.

Thereafter, the client 100 transmits the second tag T to the server 200 in step S314 and stores the encryption key K and the first tag t in step S316.

The server 200 which receives the second tag T confirms whether there is a tag in the second tag list of the DB which is the same as the received second tag T.

As illustrated in FIG. 3, when the server 200 confirms that there is a tag in the second tag list which is the same as the second tag T received from the client 100 in step S318, the server 200 adds only the client identifier U to client lists of the DB corresponding to the first tag t and the second tag T in step S320.

As described above, the client 100 sequentially creates the first tag t and the second tag T to transmit the tags to the server 200 and the server 200 searches the first tag t and the second tag T from the DBs and compares the tags to confirm the duplication of the encrypted data. When the server 200 confirms that the encrypted data is duplicated using the first tag t and the second tag T, the server 200 does not request the encrypted data C to the client but adds only the client identifier U to the client list of the DB corresponding to the first tag t and the second tag T. For example, it is assumed that encrypted data stored in the DB of the server 200 and the meta data related with the encrypted data are as illustrated in FIG. 2. In this case, when the first tag and the second tag which are calculated by the client 100 corresponding to the client identifier U3 are t3 and T'3, respectively, the server 200 may confirm that the encrypted data is duplicated using t3 and T'3 received from the client 100. In this case, as illustrated in FIG. 5, the server 200 adds only U3 to the client lists corresponding to t3 and T'3.

According to this method, the client 100 and the server 200 use the first tag t and the second tag T to confirm whether the encrypted data is duplicated but the encrypted data C is not transmitted from the client 100 to the server 200. Therefore, it is very effective in reducing a communication amount. Further, through the process of confirming the first tag t and the second tag T in the server 200, it is possible to prevent the duplicate faking attack and the data erasure attack which are problems of the related art.

In the meantime, as illustrated in FIG. 4, when the server 200 confirms that there is no tag in the second tag list which is the same as the second tag T received from the client 100 in step S418, the server 200 requests the encrypted data C to the client in step S420. When there is no tag in the second tag list which is the same as the second tag T received from the client 100, it means that there is no duplicated encrypted data in the DB. Accordingly, the server 200 requests the encrypted data C to the client 100. In FIG. 4, since steps S402 to S416 are the same as steps S302 to S316 of FIG. 3, description of steps S402 to S416 will be omitted.

The client 100 to which the encrypted data C is requested transmits the encrypted data C to the server 200 in step S422 and stores the encryption key K and the first tag t in step S424.

The server 200 which receives the encrypted data C hashes the encrypted data C to calculate a second tag T' in step S426 and stores the first tag t, the second tag T', the encrypted data C, and a client identifier U in its own DB in step S428.

As described with reference to FIG. 4, the client 100 and the server 200 confirm that the encrypted data C is not duplicated using the first tag t and the second tag T. Particularly, the server 200 confirms that there is a tag in the first list of the DB which is the same as the first tag t but there is no tag in the second list of the DB which is the same as the second tag T so that the server 200 requests the encrypted data C to the client 100. According to this method, it is possible to prevent the duplicate faking attack and the data erasure attack which are problems of the related art.

Figure 6:
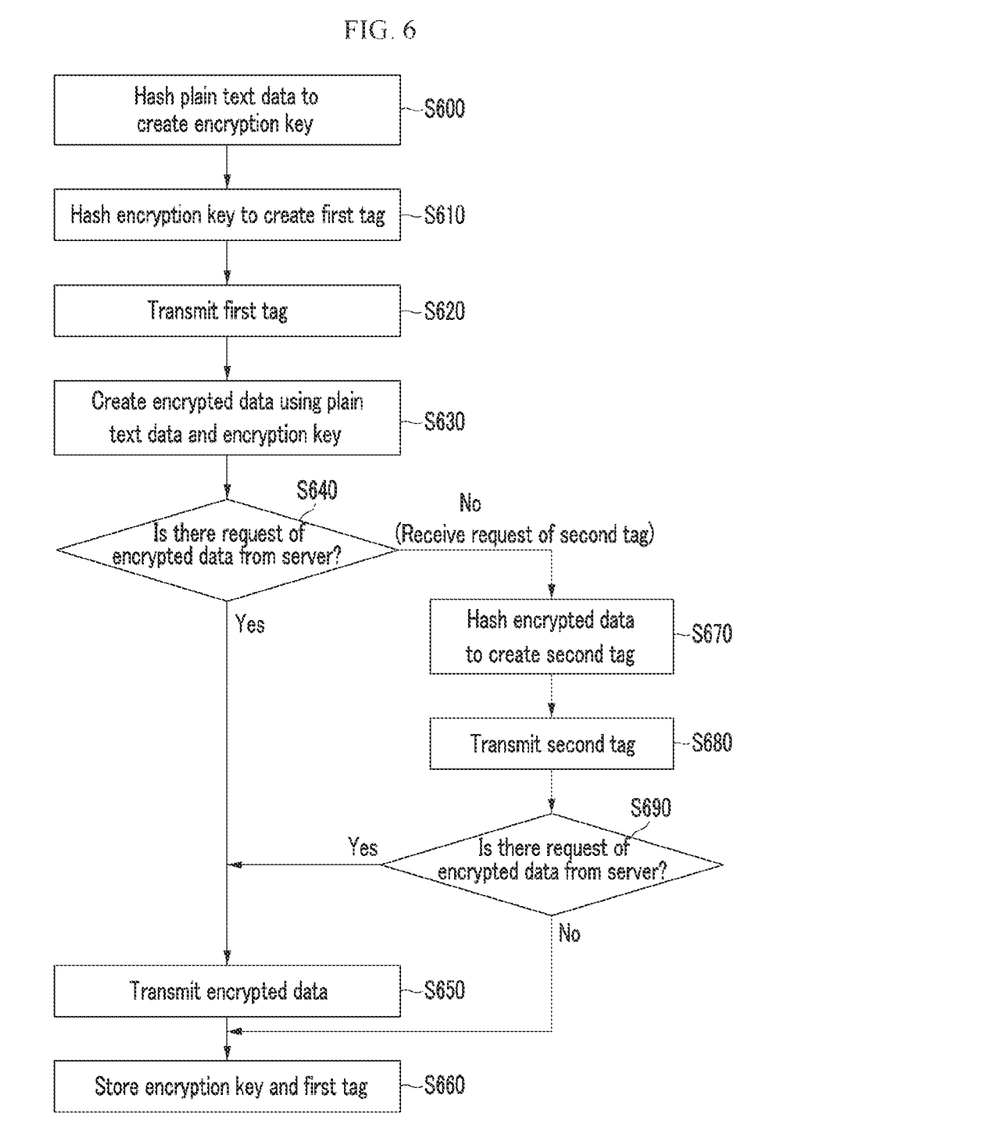
FIG. 6 is a flowchart illustrating a safe duplication processing method of encrypted data in a client according to an exemplary embodiment of the present invention.

FIG. 6 is a flowchart illustrating a safe duplication processing method of encrypted data in a client according to an exemplary embodiment of the present invention.

Referring to FIG. 6, the client 100 hashes the plain text data to create an encryption key in step S600 and hashes the encryption key to create a first tag in step S610. Thereafter, the client 100 transmits the first tag to the server 200 in step S620 and encrypts the plain text data under the encryption key using a block encryption algorithm to create encrypted data corresponding to the plain text data and the encryption key in step S630.

When the client 100 receives a request of the encrypted data from the server 200 in step S640, the client 100 transmits the encrypted data to the server 200 in step S650 and stores the encryption key and the first tag in step S660.

In the meantime, when the client 100 receives a request of the second tag from the server 200, the client 100 hashes the encrypted data to create a second tag in step S670 and transmits the second tag to the server 200 in step S680.

When the client 100 receives the request of the encrypted data from the server 200 after transmitting the second tag in step S690, the client 100 transmits the encrypted data to the server 200 in step S650 and stores the encryption key and the first tag in step S660. Further, when there is no request from the server 200 within a predetermined time after transmitting the second tag, the client 100 stores the encryption key and the first tag in step S660.

Figure 7:
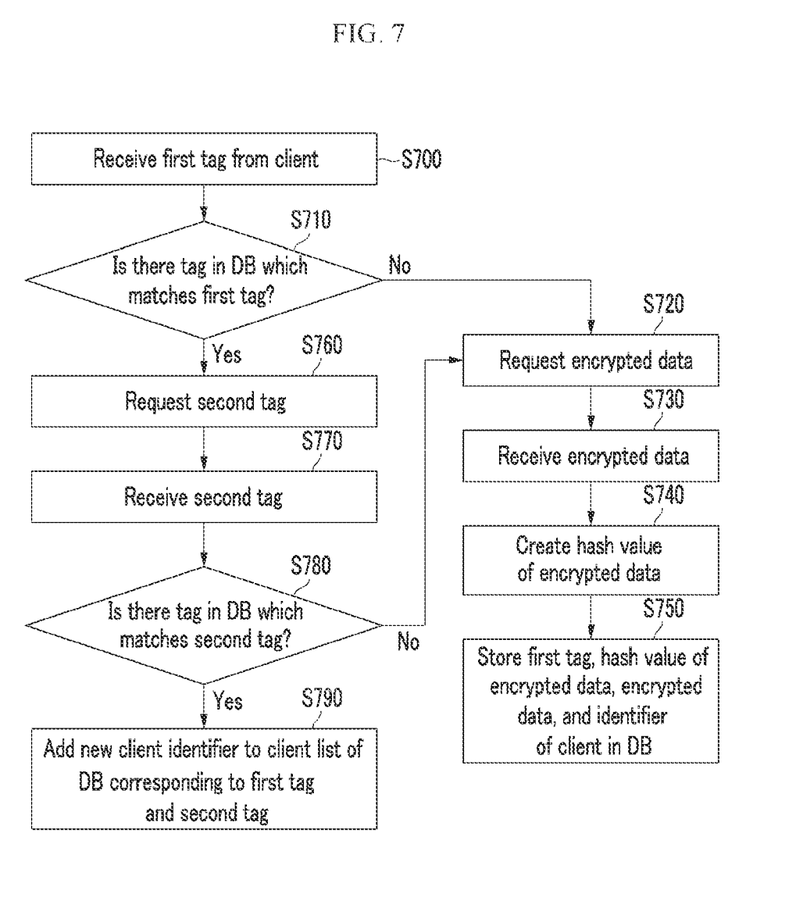
FIG. 7 is a flowchart illustrating a safe duplication processing method of encrypted data in a server according to an exemplary embodiment of the present invention.

FIG. 7 is a flowchart illustrating a safe duplication processing method of encrypted data in a server according to an exemplary embodiment of the present invention.

Referring to FIG. 7, when the server 200 receives a first tag from the client 100 in step S700, the server 200 confirms whether there is a tag in a first tag list of the DB which is the same as the tag received from the client 100 in step S710.

When there is no tag in the first tag list of the DB which is the same as the first tag received from the client 100, the server 200 requests encrypted data to the client 100 in step S720 and receives the encrypted data from the client 100 in step S730. When the server 200 receives the encrypted data from the client 100, the server 200 hashes the encrypted data to create a hash value in step S740 and uses the created hash value as a second tag to be stored in a second tag list of the DB. The server 200 stores the first tag received from the client 100, the hash value of the encrypted data, the encrypted data, and the client identifier of the client 100 in the first tag list, the second tag list, the encrypted data list and, the client list of the DB, respectively, in step S750.

In the meantime, when there is a tag in the first tag list of the DB which is the same as the first tag received from the client 100, the server 200 requests the second tag to the client 100 in step S760 and receives the second tag from the client 100 in step S770.

When the server 200 receives the second tag from the client 100, the server 200 confirms where there is a tag in the second tag list of the DB which is the same as the second tag received from the client 100 in step S780.

When there is no tag in the second tag list of the DB which is the same as the second tag received from the client 100, the server 200 requests the encrypted data to the client 100 in step S720 and performs steps S730 to S750.

In contrast, when there is a tag in the second tag list of the DB which is the same as the second tag received from the client 100, the server 200 adds a new client identifier, that is, an identifier of the client 100 to the client list of the DB corresponding to the first tag and the second tag in step S790.

Figure 8:
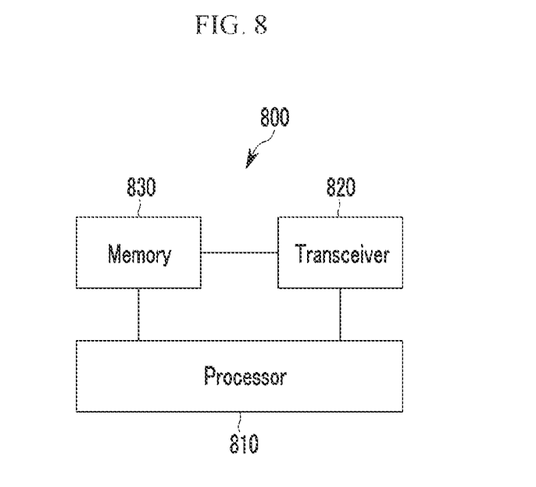
FIG. 8 is a view illustrating an encrypted data deduplicating apparatus of a client according to an exemplary embodiment of the present invention.

FIG. 8 is a view illustrating an encrypted data deduplicating apparatus of a client according to an exemplary embodiment of the present invention.

Referring to FIG. 8, an encrypted data deduplicating apparatus 800 of the client 100 includes a processor 810, a transceiver 820, and a memory 830.

The processor 810 performs functions described with reference to FIGS. 1, 3, 4, and 6. The processor 810 hashes plain text data to create an encryption key and hashes the encryption key to create a first tag, and encrypts the plain text data under the encryption key using a block encryption algorithm to create encrypted data corresponding to the plain text data and the encryption key.

The transceiver 820 performs a transmitting/receiving operation for uploading and downloading the encrypted data with the server 200. The transceiver 820 may transmit the first tag, the second tag, and the encrypted data to the server 200 and receive a request of the second tag and the encrypted data from the server 200 under control of the processor 810.

The memory 830 stores the encryption key and the first tag. Further, the memory 830 stores instructions which are executed by the processor 810 or loads the instructions from a storage device (not illustrated) to temporarily store the instructions and the processor 810 executes the instructions which are stored or loaded in the memory 830.

The processor 810 and the memory 830 are connected to each other through a bus (not illustrated) and an input/output interface (not illustrated) may also be connected to the bus. In this case, the transceiver 820 is connected to the input/output interface and peripheral devices such as an input device, a display, a speaker, and a storage device may be connected to the input/output interface.

Figure 9:
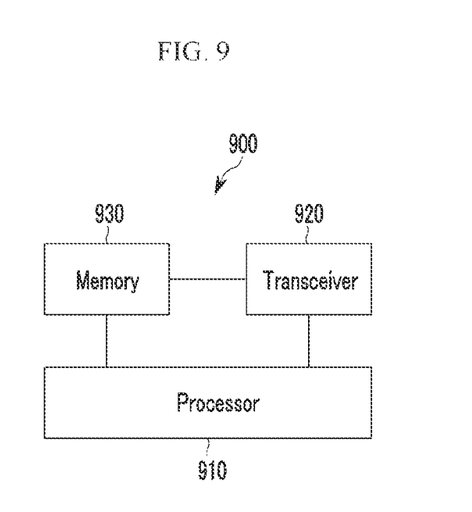
FIG. 9 is a view illustrating an encrypted data deduplicating apparatus of a server according to an exemplary embodiment of the present invention.

FIG. 9 is a view illustrating an encrypted data deduplicating apparatus of a server according to an exemplary embodiment of the present invention.

Referring to FIG. 9, an encrypted data deduplicating apparatus 900 of the server 200 includes a processor 910, a transceiver 920, and a memory 930.

The processor 910 performs functions described with reference to FIGS. 1, 3, 4, and 7. The processor 910 confirms whether the encrypted data is duplicated using the first tag and the second tag received from the client 100. When the processor 910 confirms that the encrypted data is not duplicated using the first tag and the second tag, the processor 910 requests the encrypted data from the client 100, receives the encrypted data, hashes the received encrypted data to create a hash value and then stores the first tag received from the client 100, the hash value of the encrypted data, the encrypted data, and the client identifier of the client 100 in the first tag list, the second tag list, the encrypted data list, and the client list of the DB, respectively. Further, when the processor 910 confirms that the encrypted data is duplicated using the first tag and the second tag, the processor 910 adds only the client identifier to the client list of the DB corresponding to the first tag and the second tag.

The transceiver 920 performs a transmitting/receiving operation for uploading and downloading the encrypted data with the client 100. The transceiver 920 may receive the first tag, the second tag, and the encrypted data from the client 100 and transmit requests of the second tag and the encrypted data to the client 100.

The memory 930 may include the DB 210 which has been described with reference to FIGS. 2 and 5. Further, the memory 930 stores instructions which are executed by the processor 910 or loads the instructions from a storage device (not illustrated) to temporarily store the instructions and the processor 910 executes the instructions which are stored or loaded in the memory 930.

The processor 910 and the memory 930 are connected to each other through a bus (not illustrated) and an input/output interface (not illustrated) may also be connected to the bus. In this case, the transceiver 920 is connected to the input/output interface and peripheral devices such as an input device, a display, a speaker, and a storage device may be connected to the input/output interface.

An exemplary embodiment of the present invention may be implemented in a computer system, e.g., as a computer readable medium.

Figure 10:
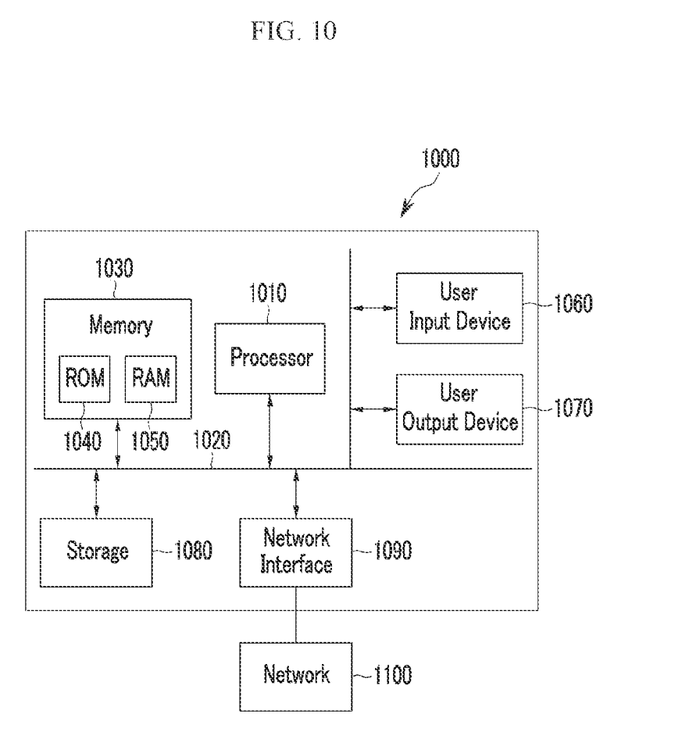
FIG. 10 is a view illustrating a computer system for an encrypted data deduplicating apparatus of a client or a server according to another exemplary embodiment of the present invention.

FIG. 10 is a view illustrating a computer system for an encrypted data deduplicating apparatus of a client or a server according to another exemplary embodiment of the present invention.

As shown in FIG. 10, a computer system 1000 may include one or more of a processor 1010, a memory 1030, a user input device 1060, a user output device 1070, and a storage 1080, each of which communicates through a bus 1020. The computer system 1010 may also include a network interface 1090 that is coupled to a network 1100. The processor 1010 may be a central processing unit (CPU) or a semiconductor device that executes processing instructions stored in the memory 1030 and/or the storage 1080. The memory 1030 and the storage 1080 may include various forms of volatile or non-volatile storage media. For example, the memory may include a read-only memory (ROM) 1040 and a random access memory (RAM) 1050.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

According to the exemplary embodiment of the present invention, a client based encrypted data duplication process which is safe from the duplicate faking attack and the data erasure attack and saves the network bandwidth is enabled. Further, a first tag whose calculation amount is small is used so that an operation amount in the client is reduced and the duplicated data is not transmitted to the server, so that a calculation amount which may be processed in the server is also reduced.

The exemplary embodiment of the present invention is not implemented only by way of the apparatus and/or the method described above, but may be implemented by a program which executes a function corresponding to the configuration of the exemplary embodiment of the present invention or a recording medium in which the program is written and those skilled in the art may easily implement the exemplary embodiment from the description of the exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for deduplicating encrypted data in a client, the method comprising:
creating an encryption key using plain text data;
creating a first tag using the encryption key;
encrypting the plain text data under the encryption key to create encrypted data;
transmitting the first tag to a server to confirm whether the encrypted data is duplicated;
after transmitting the first tag, when the client receives a request of a second tag from the server, creating the second tag using the encrypted data and transmitting the second tag to the server to confirm whether the encrypted data is duplicated; and
transmitting the encrypted data to the server in accordance with a request of the encrypted data from the server, after transmitting the first tag.

2. The method of claim 1, further comprising:
after transmitting the second tag, transmitting the encrypted data to the server in accordance with a request of the encrypted data from the server.

3. The method of claim 2, wherein:
the creating of the second tag includes hashing the encrypted data to create the second tag.

4. The method of claim 2, further comprising:
when there is no request from the server after transmitting the second tag, storing the encryption key and the first tag.

5. The method of claim 1, wherein:
when it is confirmed that the encrypted data is not duplicated using the first tag or the second tag, the request of the encrypted data is transmitted by the server, and
when it is confirmed that the encrypted data is duplicated using the first tag, the request of the second tag is transmitted by the server.

6. The method of claim 1, wherein:
the creating of the encryption key includes hashing the plain text data to create the encryption key, and
the creating of the first tag includes hashing the encryption key to create the first tag.

7. A method for deduplicating encrypted data in a server, the method comprising:
- receiving a first tag from a client;
- confirming whether encrypted data is duplicated in a database (DB) using the first tag by determining that the first tag corresponds to a first tag previously stored in the DB;
- when it is confirmed that the encrypted data is not duplicated using the first tag:
  - requesting the encrypted data to the client,
  - receiving the encrypted data from the client,
  - calculating a second tag value using the encrypted data, and
  - storing the first tag and the encrypted data which are received from the client, the calculated second tag value, and an identifier of the client in the DB; and
- when it is confirmed that the encrypted data is duplicated using the first tag:
  - requesting a second tag to the client,
  - receiving a second tag which is calculated in the client from the client, and
  - confirming whether the encrypted data is duplicated in the DB using the second tag by determining whether the second tag corresponds to a second tag value previously stored in the DB.

8. The method of claim 7, further comprising:
when it is confirmed that the encrypted data is duplicated using the second tag, adding only the identifier of the client corresponding to the first tag and the second tag which are stored in the DB.

9. The method of claim 8, further comprising:
when it is confirmed, using the second tag, that the encrypted data is not duplicated:
- requesting the encrypted data to the client,
- receiving the encrypted data from the client,
- calculating a second tag value using the encrypted data, and
- storing the first tag and the encrypted data which are received from the client, the calculated second tag value, and the identifier of the client in the DB.

10. The method of claim 8, wherein:
the calculating of a second tag value includes hashing the encrypted data to create the second tag value and
the second tag which is calculated in the client is a hash value of the encrypted data.

11. The method of claim 8, wherein:
the DB includes a first tag list, an encrypted data list, a second tag list, and a client list,
the confirming of whether the encrypted data is duplicated in the DB using the first tag includes confirming whether there is a tag in the first tag list of the DB which is the same as the first tag received from the client, and
the confirming of whether the encrypted data is duplicated in the DB using the second tag includes confirming whether there is a tag in the second tag list of the DB which is the same as the second tag received from the client.

12. An apparatus for deduplicating encrypted data in a server, the apparatus comprising
- a transceiver which receives a first tag and a second tag from a client;
- a memory in which a database (DB) is stored; and
- a processor which confirms whether the encrypted data is duplicated in the DB using the first tag and when it is confirmed that the encrypted data is duplicated using the first tag, confirms again whether the encrypted data is duplicated in the DB using the second tag, and when it is confirmed that the encrypted data is not duplicated, requests the encrypted data to the client through the transceiver.

13. The apparatus of claim 12, wherein:
the transceiver receives the encrypted data from the client, and
the processor calculates a second tag value using the encrypted data and stores the first tag and the encrypted data which are received from the client, the calculated second tag value, and an identifier of the client in the DB.

14. The apparatus of claim 13, wherein:
when the processor confirms that the encrypted data is duplicated using the first tag, the processor requests the second tag to the client through the transceiver and when the processor confirms that the encrypted data is duplicated using the second tag, the processor adds only the identifier of the client corresponding to the first tag and the second tag stored in the DB.

15. The apparatus of claim 13, wherein:
the DB includes a first tag list, an encrypted data list, a second tag list, and a client list and
when there are tags in the first tag list and the second tag list of the DB which are the same as the first tag and the second tag received from the client, respectively, the processor determines that the encrypted data is duplicated.

16. The apparatus of claim 13, wherein:
the processor hashes the encrypted data to calculate a second tag value.

* * * * *